(12) United States Patent
Clochard et al.

(10) Patent No.: US 11,727,809 B2
(45) Date of Patent: Aug. 15, 2023

(54) SYSTEM FOR INTERACTION BETWEEN AN AUTONOMOUS VEHICLE AND A VULNERABLE USER

(71) Applicant: Continental Automotive GmbH, Hannover (DE)

(72) Inventors: Pascal Clochard, Toulouse (FR); Hubert Koba, Toulouse (FR)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/631,720

(22) PCT Filed: Sep. 3, 2020

(86) PCT No.: PCT/EP2020/074614
§ 371 (c)(1),
(2) Date: Jan. 31, 2022

(87) PCT Pub. No.: WO2021/047990
PCT Pub. Date: Mar. 18, 2021

(65) Prior Publication Data
US 2022/0281381 A1   Sep. 8, 2022

(30) Foreign Application Priority Data
Sep. 11, 2019   (FR) .................................... 1909995

(51) Int. Cl.
*G08G 1/005* (2006.01)
*B60Q 1/50* (2006.01)

(52) U.S. Cl.
CPC .......... *B60Q 1/5037* (2022.05); *B60Q 1/507* (2022.05); *B60Q 1/547* (2022.05); *G08G 1/005* (2013.01)

(58) Field of Classification Search
None
See application file for complete search history.

(56) References Cited

U.S. PATENT DOCUMENTS

| 8,954,252 B1 | 2/2015 | Urmson et al. |
| 2018/0173237 A1* | 6/2018 | Reiley ..................... B60Q 1/46 |

(Continued)

FOREIGN PATENT DOCUMENTS

| DE | 102016014712 A1 | 6/2018 |
| EP | 3216653 A1 | 9/2017 |

(Continued)

OTHER PUBLICATIONS

English Translation of the Written Opinion for International Application No. PCT/EP2020/074614, dated Nov. 16, 2020, 6 pages.

(Continued)

*Primary Examiner* — Brent Swarthout
(74) *Attorney, Agent, or Firm* — RatnerPrestia

(57) ABSTRACT

A system for implementing an interaction between a semi-autonomous or autonomous motor vehicle and a vulnerable user of a carriageway used by the motor vehicle and potentially crossed by a vulnerable user at a crossing, pedestrians and cyclists being considered to be vulnerable users. The system including an environment sensor, a computer processing the data received from the one or more environment sensors, and a display device arranged on the vehicle and directed to the outside of the vehicle, the display device in the form of a horizontal strip and occupying a longitudinal end of the vehicle, and providing vulnerable users present in the vehicle's environment in the vicinity of the crossing with a visual indication as to whether or not they may cross the carriageway road surface, so that pedestrians and cyclists can obtain unambiguous information as to their presence being taken into account by the vehicle.

10 Claims, 6 Drawing Sheets

(56) References Cited

U.S. PATENT DOCUMENTS

| | | | |
|---|---|---|---|
| 2018/0174460 A1* | 6/2018 | Jung | B60Q 1/525 |
| 2019/0236938 A1 | 8/2019 | Ekladyoos et al. | |
| 2022/0013045 A1 | 1/2022 | Takeda et al. | |

FOREIGN PATENT DOCUMENTS

| | | |
|---|---|---|
| EP | 3357754 A1 | 8/2018 |
| EP | 3369616 A1 | 9/2018 |
| GB | 2531084 A | 4/2016 |

OTHER PUBLICATIONS

International Search Report and Written Opinion for International Application No. PCT/EP2020/074614, dated Nov. 16, 2020, with partial translation, 10 pages.

International Search Report and Written Opinion for International Application No. PCT/EP2020/074614, dated Nov. 16, 2020, 16 pages (French).

International Search Report and Written Opinion for International Application No. PCT/EP2020/074616, dated Nov. 16, 2020, with partial translation, 9 pages.

International Search Report and Written Opinion for international Application No. PCT/EP2020/074616, dated Nov. 16, 2020, 15 pages (French).

Hyundai "Hyundai Mobis Future Autonomous Driving M.VISION, 2019 CES", YouTube, Jan. 29, 2019, two pages, Retrieved from the internet: https //www.youtube.com/watch?v=eaibky5EhwM&feature=youtube [retrieved on Aug. 13, 2018].

AutoMotoTV, "Mercedes-Benz F 015 Luxury in Motion—Interaction Zebra Crossing AutoMotoTV", Youtube, Jan. 7, 2015, two pages, Retrieved from the Internet: https://www.youtube.com/watch?v=fvtlobbMENo [retrieved on Apr. 20, 2020].

Notice of Allowance for U.S. Appl. No. 17/632,878, dated Jan. 20, 2023, 18 pages.

\* cited by examiner

[Fig. 4]
FIG. 4
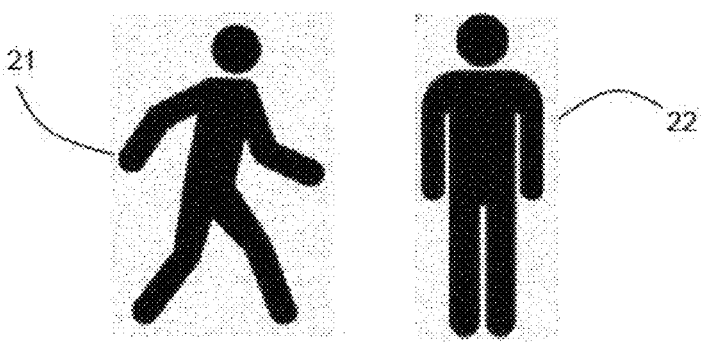
[Fig. 5A]
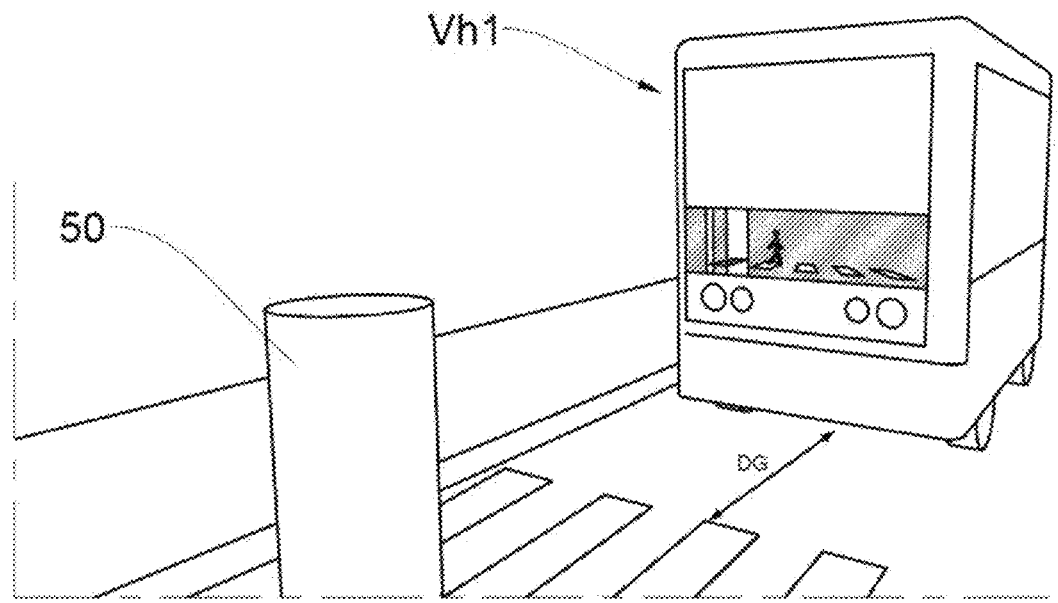

[Fig. 5B]
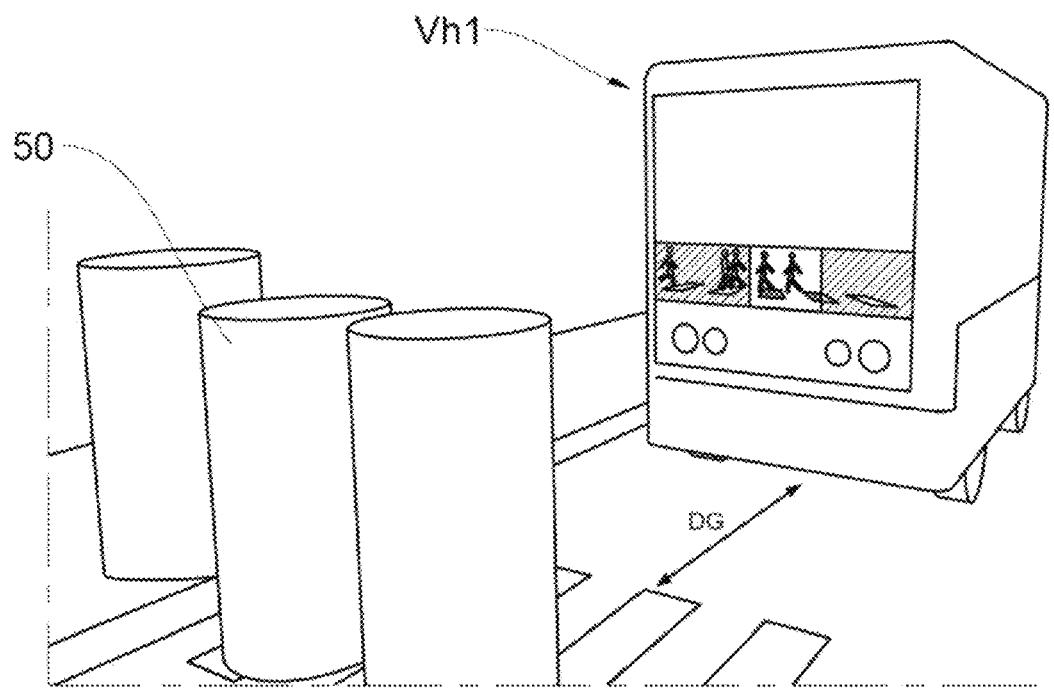
[Fig. 6]
FIG. 6
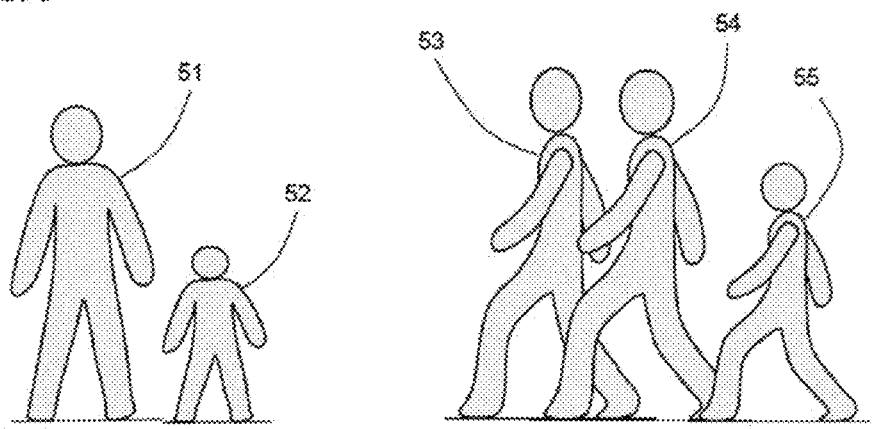

[Fig. 7]
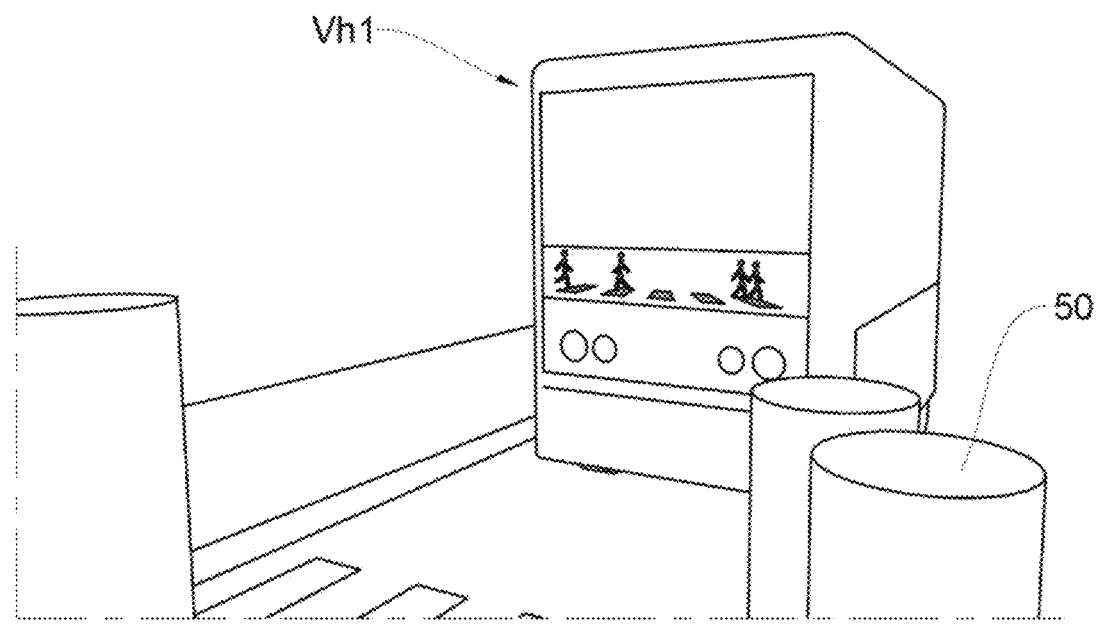

[Fig. 8]
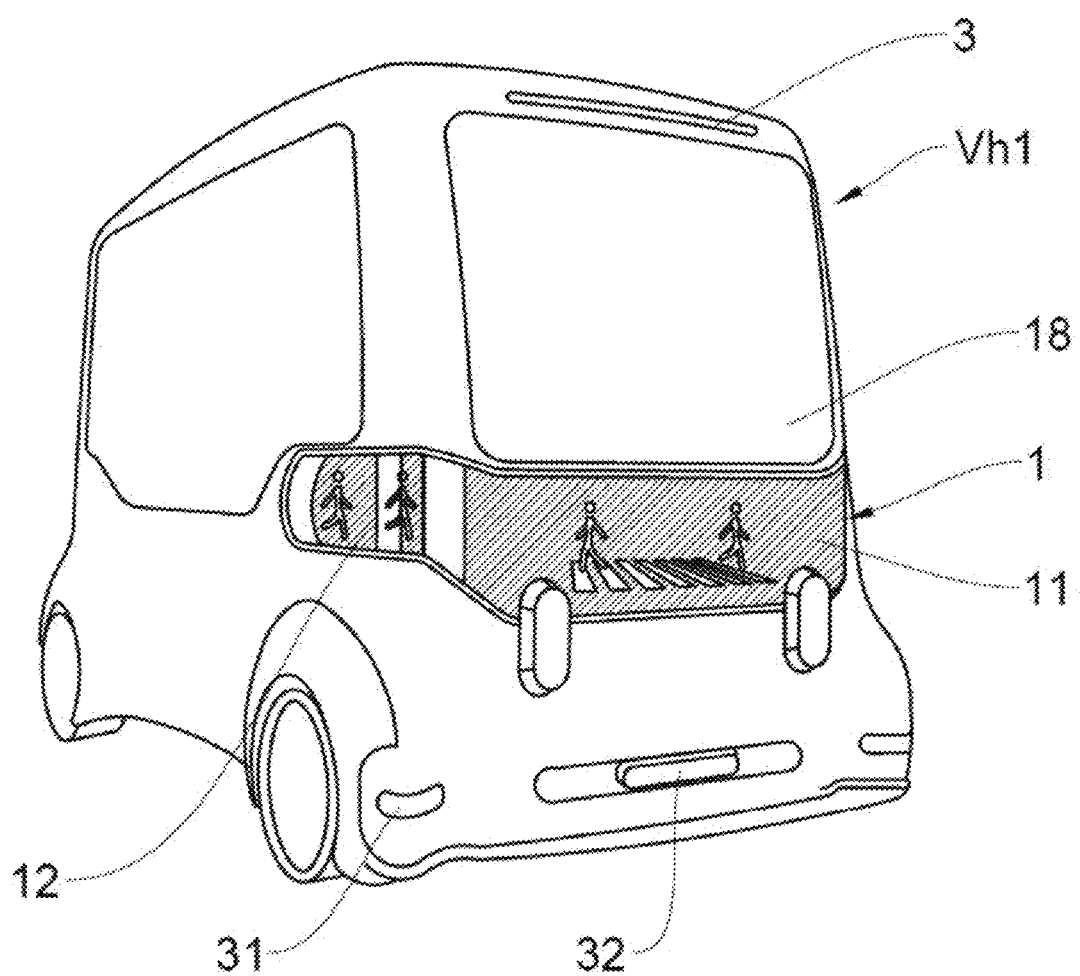

ion is the U.S. National Phase Application of PCT International Application No. PCT/EP2020/074614, filed Sep. 3, 2020, which claims priority to French Patent Application No. 1909995, filed Sep. 11, 2019, the contents of such applications being incorporated by reference herein.

SYSTEM FOR INTERACTION BETWEEN AN AUTONOMOUS VEHICLE AND A VULNERABLE USER

CROSS REFERENCE TO RELATED APPLICATIONS

This applicat

FIELD OF THE INVENTION

The present invention relates to systems for interaction between an autonomous vehicle (or semi-autonomous or partially autonomous vehicle) and one or more road users such as, for example, a pedestrian or cyclist.

BACKGROUND OF THE INVENTION

Autonomous or semi-autonomous vehicles have to travel on carriageways in either its own or a public area.

In both cases, these carriageways have protected crossings for pedestrians and other users, referred to as "vulnerable users". Vulnerable users include cyclists, pedestrians, adults or children or old people, users of various strollers, scooters, skateboards, and other personal mobility devices, monocycles, etc.

The question that arises for a vulnerable user is that of determining whether they have been perceived and taken into account by the autonomous vehicle, and relatedly whether the autonomous vehicle will stop and let said vulnerable user cross when the latter is about to cross the road.

A need has arisen to provide a solution so that the autonomous vehicle can give a clear, intuitive and unambiguous message to one or more vulnerable users which reflects the decisions made by the vehicle's onboard electronics (akin to the intentions of a conventional driver).

SUMMARY OF THE INVENTION

To that end, what is proposed therefore is a system for implementing an interaction between a semi-autonomous or autonomous motor vehicle and at least one vulnerable user of a carriageway used by the motor vehicle and potentially crossed by a vulnerable user at a crossing, which might or might not be marked, pedestrians and cyclists being considered to be vulnerable users, said system comprising:
- at least one environment sensor arranged on the vehicle,
- at least one computer on board the vehicle, processing the data received from the at least one environment sensor,
- at least one display device arranged on the vehicle, and directed to the outside of the vehicle, and controlled by the computer,
- the display device being in the form of a horizontal strip and occupying at least one longitudinal end of the vehicle;
- the display device comprising a matrix panel having at least four pixels per cm$^2$,
- the display device being configured to provide vulnerable users present in the vehicle's environment in the vicinity of the crossing with at least one visual indication as to whether or not they may cross the carriageway road surface, and delivers either an indication prompting them to cross or, conversely, an indication forbidding them from crossing, so that pedestrians and cyclists can obtain unambiguous information as to their presence being taken into account by the semi-autonomous or autonomous motor vehicle.

Based on the analysis of the environment and on the presence of vulnerable users, the autonomous vehicle decides, as applicable, to stop and give way or to continue and not to give way.

Advantageously, by analogy with the signals for pedestrians at conventional protected crossings, the autonomous or semi-autonomous vehicle provides vulnerable users present in the vehicle's environment in the vicinity with an indication prompting them to cross or, conversely, an indication forbidding them from crossing, making use in particular, but not exclusively, of the conventional colors (green, red, etc.). The level of information delivered to the vulnerable user can be more or less elaborate, as will be seen below. However, it will be noted that the information rendered on the display device differs from an optical facsimile of the scene. Thus, a vulnerable user is aware of the autonomous or semi-autonomous vehicle's intentions and can cross the road calmly in front of said vehicle.

In various embodiments of the invention, one or more of the following arrangements or features may also be used, taken individually or in combination.

According to one aspect, the display device is configured to display a representation of the scene comprising the protected crossing, with the users symbolically represented there by character avatars which may be stationary or moving. As a result, the vulnerable user identifies that the autonomous vehicle has indeed analyzed and "understood" the situation as it is and has taken the presence of these one or more vulnerable users into account. Such a symbolic representation of the scene improves the intelligibility of the message intended for the vulnerable user, in particular with reference to the learning mechanisms that take place in the subject's childhood, with acquisition of the identity of the characters including their own, and matching of the images as perceived in a mirror with images perceived directly (while accounting for symmetry). The representation of the scene by the display device reproduces this mirror effect after a fashion, which makes the displayed message intuitive and easy to understand.

According to one aspect, the rendering, by the display device, of the presence of one or more vulnerable users present in the vehicle's environment in the vicinity of the protected crossing is performed in real time and the respective positions of avatars representing the users relative to the protected crossing reflect reality with a delay of less than 1 second, preferably less than 600 ms.

It is indeed a depiction of the actual scene that is represented and that, being perceived in real time by the vulnerable user, makes it more intuitive to grasp that what is taken into account by the vehicle's onboard electronics is correct and corresponds to the actual situation experienced by the vulnerable user. This strengthens the intelligibility of the message.

According to one aspect, provision is made in the animation rendered by the display device in real time for the number of avatars to correspond to the number of people actually detected in the environment.

This strengthens the representativeness of the rendering on the display device with respect to the real world.

Thus, it is easier for the vulnerable user to recognize that it is indeed the scene actually experienced which is symbolically represented on the vehicle's display.

According to one aspect, the strip can occupy substantially the entire width of the front face of the vehicle and/or the entire width of the rear face of the vehicle. As a result, on one hand there is a large area available for displaying an explicit message and on the other hand this message can be picked up by vulnerable users who are located on either side of the vehicle.

It is not excluded for the display strip to continue laterally over to the lateral portion of the vehicle on each side; this maximizes the visibility of the display to vulnerable users nearby.

According to one aspect, the vehicle can comprise a display device on its front face and on its rear face, preferably over the entire width. Advantageously, for a vehicle having a preferred direction of travel, the display device on the rear face will be intended for vehicles following it to indicate, for example, that overtaking is not advised, or even forbidden, because of vulnerable parties crossing the road in front of the autonomous vehicle. Furthermore, for two-way shuttle-type vehicles, when the shuttle vehicle changes the main direction of travel, the role of the front and rear displays is then reversed, and the two displays are used symmetrically.

According to one aspect, the computer is configured to classify the entities perceived by the one or more environment sensors. This classification makes it possible to identify and isolate human or animal characters; said classification makes it possible, conversely, to remove street furniture elements such as garbage cans, posts, barriers, as well as vegetation elements such as shrubs or the like, etc.

Thus, the representation of the scene makes it possible to highlight the characters in particular and to partially or completely ignore fixed objects which have no intention of crossing the road.

In addition, the representation of the scene can highlight, by means of a differentiated representation, the classification of the various entities, for example pedestrians, cyclists, scooter users, stroller users as well as possibly a representation of the size of the characters, for example adults versus children. It is also not excluded for the gender of the characters to be distinguished: female, male or even neutral.

The avatars reflect each category of entity and contribute to realistic and intelligible rendering of the display, without this being an optical facsimile of the scene of interest.

According to another optional aspect, each avatar reflecting the type of vulnerable user according to the classification can have characteristics representative of the classification of the entity: size of the character, direction of movement, stationary posture, low speed, high speed. Accessories used by the character can also be depicted; for example a bicycle, a skateboard, a stroller, a scooter, a pet, etc.

According to another optional aspect, each avatar reflecting each vulnerable user present in the scene is represented substantially at the geographical position where they are located over time and in real time. The position of pedestrians, and more generally of vulnerable users, over time in the representation of the scene of interest lets pedestrians easily understand that the autonomous vehicle understands and monitors the situation as it changes in real time.

According to one aspect, the display device is arranged at a height defined by a bottom line of the display located above 1 m from the ground and its top line located below 1.40 m from the ground.

In this way, an attempt is made to get as close as possible to the visual interaction that occurs between a driver of a conventional vehicle and a pedestrian in a case of a conventional situation of a vehicle driven by a person. This arrangement at a position above the ground corresponding to the area of a conventional driver's face allows the vulnerable user to move in a mixed-traffic environment with both conventional vehicles driven by drivers and semi-autonomous or autonomous vehicles with or without a driver present.

In other words, the display device is located within the range [1 m-1.4 m]; it is noted that this facilitates reading for the average user and provides an analogy with the conventional case (personified driver).

In one aspect, the display device is configured to display an indication that the vehicle is about to start off and drive over the protected crossing.

This forms a clear and unambiguous warning/notification of the imminent movement of the vehicle.

According to one optional aspect, the environment sensor arranged on the vehicle is configured to sense the environment on both sides of the carriageway road surface to the front and thus react according to the possible presence of vulnerable users on either side of the road. In other words, the treatment can be advantageously symmetrical with respect to both sides of the roadway.

According to one optional aspect, the vehicle can further comprise a sound source, which is used in addition to the display device and is controlled by the computer.

According to one optional aspect, the vehicle can provide illumination of the crossing, by means of lamps for example, which may be directional, as applicable, which may prove useful at night and which strengthens the perception and the intelligibility of the message that the vulnerable user receives from the autonomous vehicle.

This strengthens the visual message, which is of some use in particular for vulnerable users focusing all of their attention on using their smartphone for example.

An aspect of the invention also relates to a method for interaction between a semi-autonomous or autonomous motor vehicle and at least one vulnerable user of a carriageway used by the motor vehicle and potentially crossed by a vulnerable user at a crossing, which might or might not be marked, pedestrians and cyclists being considered to be vulnerable users, said vehicle comprising at least one environment sensor arranged on the vehicle, at least one computer on board the vehicle, at least one display device arranged on the vehicle, and directed to the outside of the vehicle, and controlled by the computer, the method making provision for:

the environment sensor to detect entities present in the vehicle's environment and in particular in a region located in its direction of travel, the computer to classify the entities by identifying vulnerable users including pedestrians and cyclists and users of scooters, skateboards, or strollers, the display device providing vulnerable users present in the vehicle's environment in the vicinity of the crossing with at least one visual indication as to whether or not they may cross the carriageway road surface, and delivers either an indication prompting them to cross or, conversely, an indication forbidding them from crossing.

Thus pedestrians and cyclists can obtain unambiguous information as to their presence being taken into account by the semi-autonomous or autonomous motor vehicle.

BRIEF DESCRIPTION OF THE DRAWINGS

Other features, details and advantages will become apparent from reading the following detailed description and from examining the appended drawings, in which:

FIG. 4 illustrates two exemplary indications for allowing crossing or, conversely, forbidding crossing, FIGS. 5A and 5B illustrate the display configuration on the strip of the vehicle's front display device, with pedestrians crossing in front of the vehicle, FIG. 6 illustrates various types of avatars representing pedestrians, the avatars being inserted into the representation of the scene with their position and the change in each position over time, FIG. 7 illustrates the display toward the end of the crossing sequence indicating that the vehicle is about to start off, and FIG. 8 illustrates one particular variant embodiment, relating to a shuttle-type autonomous vehicle.

DETAILED DESCRIPTION OF THE PREFERRED EMBODIMENTS

In the various figures, the same references have been used to reference identical or similar elements.

Figure 1:
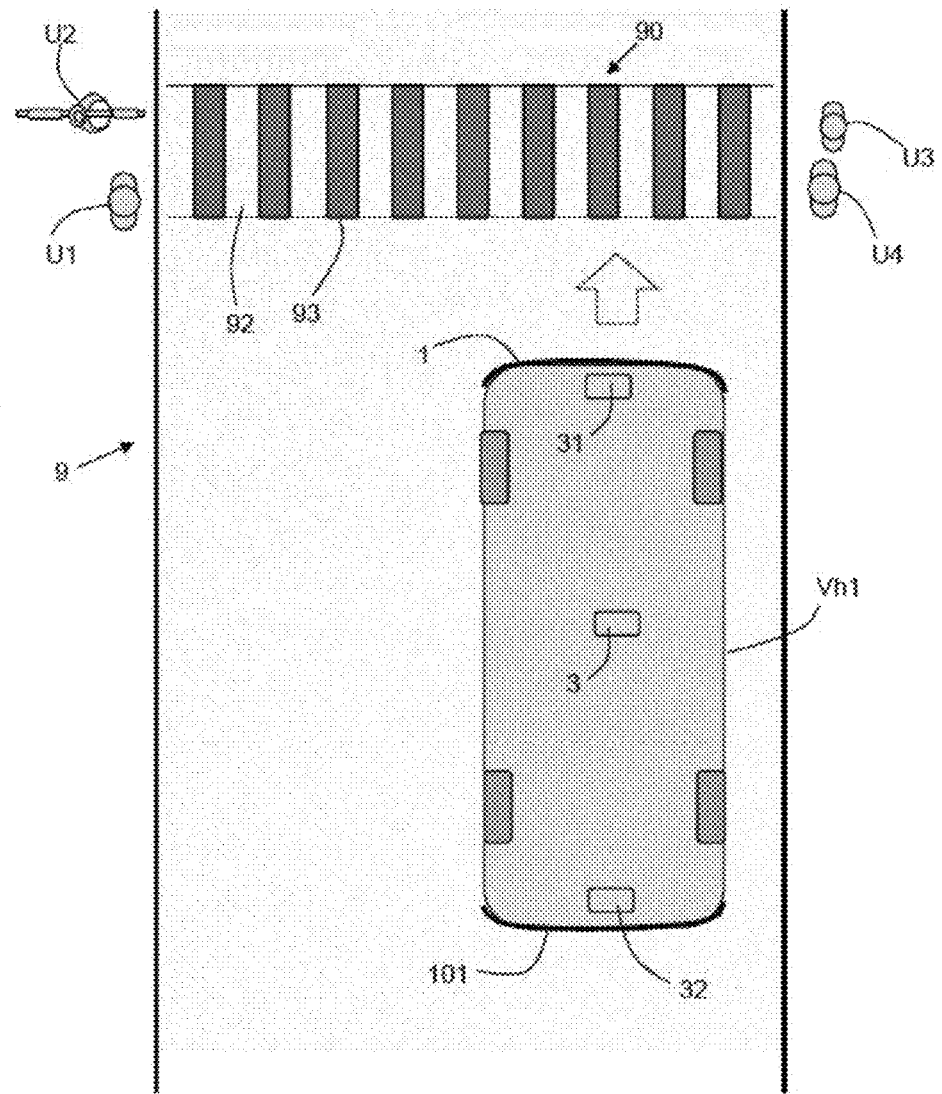
FIG. 1 is a general basic diagram of one embodiment of the invention.

With reference to FIG. 1, a semi-autonomous or autonomous motor vehicle Vh1 travels on a carriageway 9 which can be either a road or a street. FIG. 1 shows a pedestrian crossing referenced by 90, which in the present case is marked by lines painted on the ground (alternation of black and white strips 92, 93). However, it should be noted that in some cases, there may be pedestrian crossings which are not marked on the ground or else they are marked in another way, for example via crossing markings, pseudo crossing markings, lines and/or dots. In certain cases the crossing may be qualified as a "protected crossing", but the invention is not limited to that case.

Regarding the vehicle, it is an autonomous, or semi-autonomous or partially autonomous vehicle, that is to say that, in practice, this may correspond to a case where there is no one driving the vehicle, nor any person in any driving position (completely autonomous vehicle), this can also correspond to a case where there is someone in the driving position but who delegates driving functions to the driver assistance functions performed by the onboard electronics. It is noted that the level of delegation can change over time.

It is noted that an aspect of the invention can also be applied to a vehicle driven in a conventional manner but with tinted windows that make visual contact between pedestrians and the driver impossible.

It should be noted that the vehicle in question can be a private vehicle, a minibus, a van, a delivery truck, a taxi, or a self-driving taxi. The vehicle in question can also be a tram, a trolleybus, a tram-train, etc.

The vehicle in question can be designed to travel on carriageways in either its own or a public area, or in mixed situations where it uses carriageways in its own area and then carriageways in a public area or vice versa.

As will be seen in more detail below, the vehicle Vh1 is provided with one display device 1 at the front of the vehicle (in the normal direction of travel) and, optionally, another display device 101 located at the rear of the vehicle.

The carriageway can be one-way or can be two-way. It is not excluded for there to be a plurality of parallel lanes in the same direction which corresponds, in everyday language, to a multi-lane traffic thoroughfare.

Coming now to the users of the carriageway, "vulnerable users" are generally defined as those people present who are not in a vehicle's passenger compartment; the concept of "vulnerable users" includes pedestrians, cyclists, adults, children or old people, users of various strollers, scooters, skateboards, personal mobility devices, monocycles, etc. The concept of "vulnerable users" can also include pets.

FIG. 1 shows a pedestrian U1 located to the left of the road from the vehicle's point of view, a cyclist U2 preparing to cross the road from the left, and an adult U4 and a child U3 who are both pedestrians and are preparing to cross the road from the right from the vehicle's point of view.

Figure 2:
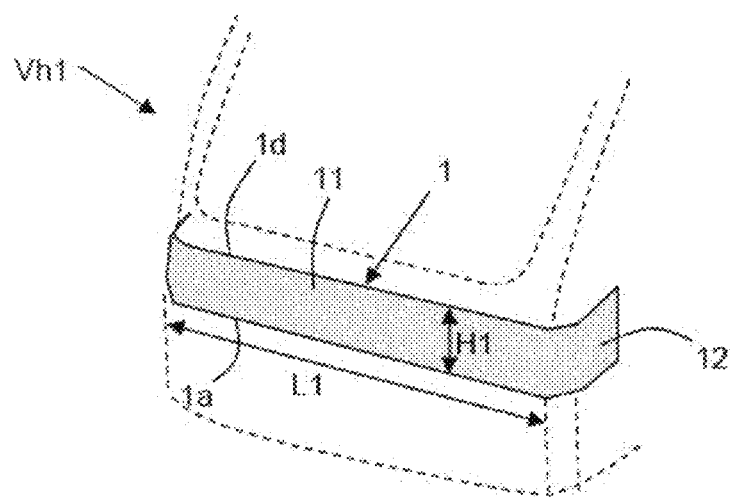
FIG. 2 shows one example of a basic diagram relating to the main display screen.

The display device 1 can be presented as illustrated in FIG. 2 with a main strip 11 which extends over the entire width of the vehicle.

In the example illustrated, the display device 1 is rectangular with a bottom edge 1a and a top edge 1d.

The display device is arranged at least on one longitudinal end of the vehicle.

A lateral extension 12 onto the side of the vehicle can be provided, either on one side only or on both sides symmetrically.

The strip is horizontal, that is to say wider than it is high. It may be generally rectangular in shape.

The typical dimensions of the horizontal strip are at least 1.60 m in width and 30 cm in height. Generally, the height H1 will be within a range [20 cm-40 cm]. Generally, the width L1 will be within a range [140 cm-200 cm].

The lateral extension 12 may have the same height, or even a greater height, and it may have a length in the longitudinal direction of between 20 and 50 centimeters.

The height position of the display device is defined by a bottom line of the display located above 0.9 m from the ground and its top line located below 1.50 m from the ground. Stated otherwise, the display device is located within the range [0.9 m-1.5 m].

The display device comprises a matrix panel whose resolution is at least four pixels per $cm^2$, or 25 pixels per square inch. Of course, a higher resolution is entirely possible.

The display device can be in the form of an LED matrix, either a matrix of multicolor LEDs or interlaced matrices of monochromatic LEDs. The primary colors can be used as the basis for generating, in particular, the colors red and green but also other, additional colors.

The vehicle is equipped with one or more environment sensors 3. Regarding the environment sensor, it can be a lidar sensor, for example with 360° coverage; it can be a radar; it can be a 3D camera; it can be a time-of-flight (TOF) camera; or it can be a combination of a plurality of sensors.

In addition, provision is made to use an infrared camera which makes it possible to detect the temperature of each source and, in particular, facilitates the classification of entities in order to extract living beings from the environment.

FIG. 1 shows, for example, a central sensor 3 arranged on the roof of the vehicle, for example a 360° lidar. In addition, another sensor 31 is provided at the front of the vehicle chosen from the technologies listed above. In addition, another sensor 32 is provided at the rear of the vehicle chosen from the technologies listed above.

According to another configuration illustrated in FIG. 8, provision can be made for a sensor 3 located in the upper region of the vehicle's front portion, and sensors 31, 32 arranged in the vehicle's bumper, each of these sensors being able to be of any of the above types.

The vehicle comprises at least one computer referenced by 4; said computer may also be referred to as an "electronic control unit" ("ECU").

The computer 4 processes the data received from the one or more environment sensors and performs one or more operations for classifying the entities that are detected in the images or, more generally, the data received from the sensors.

In particular, an algorithm is provided which makes it possible to extract, from the data or images received from the sensors, entities corresponding to living beings, people or animals in the vehicle's immediate environment.

The classification of the entities may involve image content analysis and/or spectral analysis.

Certain elements can give rise to easier recognition, such as bicycle or stroller wheels; specifically, a continuous or discontinuous ellipse (a plurality of arcs of an ellipse) is recognized.

The classification of the entities can also make use of a motion analysis, in particular to identify the motions of people in the data or images received from the sensors.

After analyzing the data received from the sensors, if it is determined that one or more vulnerable users are about to cross the roadway, the computer can decide to stop the autonomous vehicle and give way to allow the vulnerable users to cross.

It is noted that analysis and classification are performed continuously under the conditions where the vehicle has decided to stop to allow pedestrians to cross.

It is noted that analysis and classification continue as vulnerable users cross the road.

The display device 1 is configured to provide the vulnerable users present in the vehicle's environment in the vicinity of the protected crossing with at least one visual indication as to whether or not they may cross the carriageway road surface, and delivers either an indication prompting them to cross or, conversely, an indication forbidding them from crossing.

Particularly, the visual indication may use a conventional color code, namely green to indicate a prompt to cross and red to indicate that crossing is forbidden.

The visual indication can, in particular, use all or some of the pictograms commonly used at pedestrian crossings, namely a pictogram indicating a prompt to cross in green, illustrated by reference 21 in FIG. 4, and a pictogram indicating that crossing is forbidden in red, illustrated by reference 22 in FIG. 4. The color orange can also be used for the pictograms. Using effects involving changes of color from among the above colors or else other colors is not excluded either.

The conventional pictograms 21, 22 can, in particular, be displayed on the lateral extensions 12 of the display device, as by analogy with the pictograms for crossings for pedestrians.

The display is updated in real time, according to the stream of information received from the environment sensors.

The display device is configured to display a representation of the scene comprising the protected crossing, as illustrated in FIGS. 5A, 5B and 7, with the users symbolically represented there by character avatars which may be stationary or moving.

Each avatar reflecting the type of vulnerable user according to the classification can have characteristics representative of the classification of the entity: size of the character, direction of movement, stationary posture, low speed, high speed. Accessories used by the character can also be depicted; for example a bicycle, a skateboard, a stroller, a scooter, a pet, etc.

More precisely, as illustrated in FIG. 6, the posture and size of the avatars represented reflects the presence and the posture of the people actually present in the vicinity of the vehicle, for example an adult in a stationary posture 51, a child in a stationary posture 52, two adults crossing together 53, 54, and a walking teenager 55.

In FIGS. 5A and 5B, the character avatars are in the shape of cylinders 50.

The computer 4 can access map databases which allow it to determine the position of the protected crossings listed, without this constituting an exhaustive list however. Thus, the level of filtering performed by the computer with regard to the human or animal entities classified may depend on the presence or absence of a listed protected crossing; in practice, the decision to stop to allow pedestrians to cross will be favored at the protected crossings listed.

In the event that no pedestrian crosses despite the presence of entities classified as persons at the sides of the road, the autonomous vehicle switches back from the message prompting crossing to a message forbidding crossing and/or a message indicating that the vehicle is about to start off.

Figure 3:
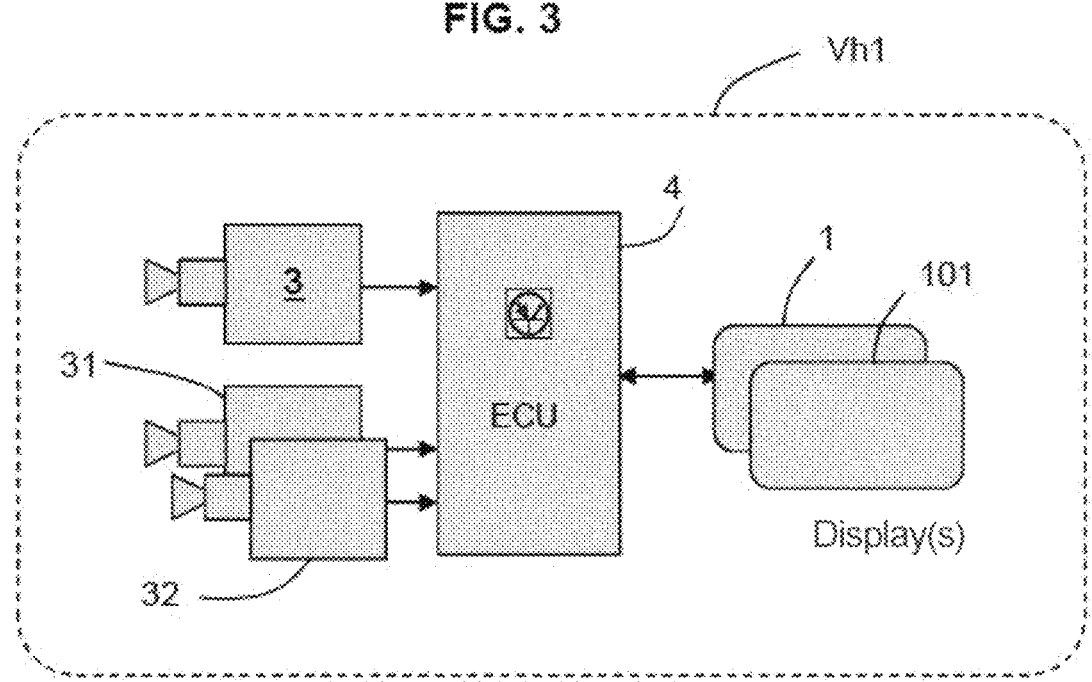
FIG. 3 shows a functional schematic view of the main display screen.

As shown in FIG. 3, the computer 4 receives a continuous stream of data from the one or more environment sensors 3, 31, 32 via an onboard local area network or wirelessly, and it is connected to one or more displays via an onboard local area network or wirelessly.

In addition, a sound source can be provided, which is used in addition to the display device and is controlled by the computer, to make it possible to strengthen the level of information for the users, complementing purely visual information which might be insufficient for certain vulnerable users focused on using their smartphone.

In addition, a light source can be provided on the vehicle, used in addition to the display device, and controlled by the computer 4, to allow the crossing, which might or might not be marked on the ground, to be illuminated, in order to strengthen the perception and intelligibility of the message given by the display device to a vulnerable user crossing, or about to cross, the road.

It is noted that the semi-autonomous or autonomous vehicle, when it stops to allow pedestrians to cross, observes a safety distance, referenced by DG, with respect to the marked crossing, as illustrated in FIGS. 5A and 5B. The safety distance DG can be configured to be between 1 m and 3 m; the safety distance can also be dependent on the circumstances, for example day or night, the type of carriageway, or the classification of the vulnerable users identified.

With reference to FIG. 8, the front façade of the vehicle is almost vertical with, from bottom to top, a bumper in the bottom portion, then a front body region, then the main display strip 11, then a glazed region 18, above which is one of the sensors 3.

It is noted that the lateral extensions 12 on the side of the vehicle have a position that is slightly higher than the front central strip 11. For example, the lateral extensions 12 each extend in the longitudinal direction over at least 30 cm, and over a height of 25 to 40 cm.

In the example shown, the display device is continuous, i.e. there is no interruption between the lateral extensions 12 and the front central strip 11, which allows an avatar to move continuously from one side to the other without any singular point, as when the vulnerable user is crossing. However, it is not excluded for there to be a front strip and lateral displays which are not directly an extension of the front strip.

The invention claimed is:

1. A system for implementing an interaction between a semi-autonomous or autonomous motor vehicle and at least one vulnerable user of a carriageway used by the motor vehicle and potentially crossed by a vulnerable user at a crossing, which might or might not be marked, pedestrians and cyclists being considered to be vulnerable users, said system comprising:
   at least one environment sensor arranged on the vehicle;
   at least one computer on board the vehicle, processing the data received from the at least one environment sensor; and
   at least one display device arranged on the vehicle, and directed to the outside of the vehicle, and controlled by the computer,
   wherein,
   the display device is in the form of a horizontal strip and occupies at least one longitudinal end of the vehicle;
   the display device comprises a matrix panel having at least four pixels per cm², and
   the display device being configured to provide vulnerable users present in an environment of the vehicle in the vicinity of the crossing with at least one visual indication as to whether or not they may cross the carriageway road surface, and delivers either an indication prompting them to cross if the vulnerable user is at a protected crossing or, conversely, an indication forbidding them from crossing if the vulnerable user is not at a protected crossing, so that pedestrians and cyclists can obtain unambiguous information as to their presence being taken into account by the semi-autonomous or autonomous motor vehicle, the display device also being configured to display a representation of a scene comprising the crossing, the users being symbolically represented by character avatars which may be stationary or moving, of which the rendering, by the display device, is performed in real time and of which the respective positions relative to the crossing reflect reality with a delay of less than 1 second, and of which a number corresponds to the number of people actually detected in the vehicle's environment.

2. The system as claimed in claim 1, wherein the strip occupies substantially an entire width of a front face of the vehicle and/or an entire width of a rear face of the vehicle.

3. The system as claimed in claim 1, wherein the vehicle comprises a display device on its front face and on its rear face, over the entire width.

4. The system as claimed in claim 1, wherein the computer is configured to classify entities perceived by the one or more environment sensors.

5. The system as claimed in claim 1, wherein the display device is arranged at a height defined by a bottom line of the display located above 1 m from the ground and its top line located below 1.40 m from the ground.

6. The system as claimed in claim 1, wherein the display device is configured to display an indication that the vehicle is about to start off and drive over the crossing.

7. A vehicle comprising a system as claimed in claim 1.

8. The system as claimed in claim 2, wherein the vehicle comprises a display device on its front face and on its rear face, over the entire width.

9. The system as claimed in claim 1, wherein the delay is less than 600 ms.

10. The system as claimed in claim 1, wherein the computer obtains information from a map database to determine if the crossing is a protected crossing.

* * * * *